US012248089B2

(12) United States Patent
Zoubi et al.

(10) Patent No.: US 12,248,089 B2
(45) Date of Patent: Mar. 11, 2025

(54) FREQUENCY MODULATED CONTINUOUS WAVE RADAR DETECTION IN THE PRESENCE OF PHASE NOISE

(71) Applicant: QUALCOMM Incorporated, San Diego, CA (US)

(72) Inventors: Ahmad Bassil Zoubi, San Diego, CA (US); Anant Gupta, San Diego, CA (US); Sheng-Yuan Tu, San Diego, CA (US); Roberto Rimini, San Diego, CA (US); Neevan Ramalingam, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 395 days.

(21) Appl. No.: 17/649,759

(22) Filed: Feb. 2, 2022

(65) Prior Publication Data

US 2023/0243921 A1   Aug. 3, 2023

(51) Int. Cl.
*G01S 7/35* (2006.01)
*G01S 13/34* (2006.01)
*H04B 1/12* (2006.01)

(52) U.S. Cl.
CPC .............. *G01S 7/352* (2013.01); *G01S 13/34* (2013.01); *H04B 1/123* (2013.01)

(58) Field of Classification Search
CPC .......... G01S 7/352; G01S 13/34; G01S 7/354; G01S 7/006; G01S 7/358; H04B 1/123
See application file for complete search history.

(56) References Cited

U.S. PATENT DOCUMENTS 9,746,549 B1 *   8/2017   Parker ..................... G01S 7/292
10,101,438 B2   10/2018   Subburaj et al.
(Continued)

OTHER PUBLICATIONS

International Search Report and Written Opinion—PCT/US2022/080491—ISA/EPO—Apr. 12, 2023.
(Continued)

*Primary Examiner* — Olumide Ajibade Akonai
*Assistant Examiner* — Yonghong Li
(74) *Attorney, Agent, or Firm* — QUALCOMM Incorporated (57) ABSTRACT

In some aspects, a radar device may receive a plurality of received signals comprising a plurality of reflected frequency modulated continuous wave radar signals and phase noise. The radar device may obtain a frequency-domain representation of the received signals comprising a plurality of frequency-domain spectrums. The radar device may determine a shaped noise component of the frequency-domain representation corresponding to a negative distance portion of the frequency-domain representation. The radar device may determine a shaped decision boundary for target detection based at least in part on the shaped noise component, wherein the shaped decision boundary corresponds to a positive distance portion of the frequency-domain representation. The radar device may detect a radar target based at least in part on the shaped decision boundary. The radar device may perform an action based at least in part on detecting the radar target. Numerous other aspects are described.

30 Claims, 6 Drawing Sheets

(56) References Cited

U.S. PATENT DOCUMENTS

| | | |
|---|---|---|
| 2011/0291875 A1* | 12/2011 | Szajnowski ............ G01S 13/34 |
| | | 342/70 |
| 2018/0252802 A1* | 9/2018 | Tong ....................... G01S 13/26 |
| 2020/0025871 A1* | 1/2020 | Subburaj ................. G01S 7/414 |
| 2021/0055386 A1* | 2/2021 | Rimini .................... G01S 7/003 |
| 2021/0173042 A1* | 6/2021 | Wu .......................... G01S 7/356 |
| 2021/0190902 A1* | 6/2021 | Amihood ................ G01S 7/358 |
| 2021/0356558 A1 | 11/2021 | Fuchs |

OTHER PUBLICATIONS

Murali S., et al., "Interference Detection in FMCW Radar using a Complex Baseband Oversampled Receiver", 2018 EEE Radar Conference (RADARCONF18), Apr. 23, 2018, XP033357124, pp. 1567-1572.

* cited by examiner

FREQUENCY MODULATED CONTINUOUS WAVE RADAR DETECTION IN THE PRESENCE OF PHASE NOISE

FIELD OF THE DISCLOSURE

Aspects of the present disclosure generally relate to radar technologies and, for example, to frequency modulated continuous wave radar detection in the presence of phase noise.

BACKGROUND

A radar device is a type of sensor device that may be used to detect a target, determine characteristics of the target, and/or the like. Radar devices may be used in user equipment and may be used to determine characteristics associated with a radar target and/or characteristics associated with an environment of a user vehicle. For example, a radar device may be configured to detect proximity to a target such as a user or a hand of a user.

SUMMARY

Some aspects described herein relate to a radar device for wireless communication. The radar device may include a memory and one or more processors coupled to the memory. The one or more processors may be configured to receive a plurality of received signals comprising a plurality of reflected frequency modulated continuous wave (FMCW) radar signals and phase noise. The one or more processors may be configured to obtain a frequency-domain representation of the plurality of received signals comprising a plurality of frequency-domain spectrums corresponding to the plurality of received signals. The one or more processors may be configured to determine a shaped noise component of the frequency-domain representation, wherein the shaped noise component corresponds to a negative distance portion of the frequency-domain representation. The one or more processors may be configured to determine a shaped decision boundary for target detection based at least in part on the shaped noise component, wherein the shaped decision boundary corresponds to a positive distance portion of the frequency-domain representation. The one or more processors may be configured to detect a radar target based at least in part on the frequency-domain representation and the shaped decision boundary. The one or more processors may be configured to perform an action based at least in part on detecting the radar target.

Some aspects described herein relate to a method performed by a radar device. The method may include receiving a plurality of received signals comprising a plurality of reflected FMCW radar signals and phase noise. The method may include obtaining a frequency-domain representation of the plurality of received signals comprising a plurality of frequency-domain spectrums corresponding to the plurality of received signals. The method may include determining a shaped noise component of the frequency-domain representation, wherein the shaped noise component corresponds to a negative distance portion of the frequency-domain representation. The method may include determining a shaped decision boundary for target detection based at least in part on the shaped noise component, wherein the shaped decision boundary corresponds to a positive distance portion of the frequency-domain representation. The method may include detecting a radar target based at least in part on the frequency-domain representation and the shaped decision boundary. The method may include performing an action based at least in part on detecting the radar target.

Some aspects described herein relate to a non-transitory computer-readable medium that stores a set of instructions for wireless communication by a radar device. The set of instructions, when executed by one or more processors of the radar device, may cause the radar device to receive a plurality of received signals comprising a plurality of reflected FMCW radar signals and phase noise. The set of instructions, when executed by one or more processors of the radar device, may cause the radar device to obtain a frequency-domain representation of the plurality of received signals comprising a plurality of frequency-domain spectrums corresponding to the plurality of received signals. The set of instructions, when executed by one or more processors of the radar device, may cause the radar device to determine a shaped noise component of the frequency-domain representation, wherein the shaped noise component corresponds to a negative distance portion of the frequency-domain representation. The set of instructions, when executed by one or more processors of the radar device, may cause the radar device to determine a shaped decision boundary for target detection based at least in part on the shaped noise component, wherein the shaped decision boundary corresponds to a positive distance portion of the frequency-domain representation. The set of instructions, when executed by one or more processors of the radar device, may cause the radar device to detect a radar target based at least in part on the frequency-domain representation and the shaped decision boundary. The set of instructions, when executed by one or more processors of the radar device, may cause the radar device to perform an action based at least in part on detecting the radar target.

Some aspects described herein relate to an apparatus for wireless communication. The apparatus may include means for receiving a plurality of received signals comprising a plurality of reflected FMCW radar signals and phase noise. The apparatus may include means for obtaining a frequency-domain representation of the plurality of received signals comprising a plurality of frequency-domain spectrums corresponding to the plurality of received signals. The apparatus may include means for determining a shaped noise component of the frequency-domain representation, wherein the shaped noise component corresponds to a negative distance portion of the frequency-domain representation. The apparatus may include means for determining a shaped decision boundary for target detection based at least in part on the shaped noise component, wherein the shaped decision boundary corresponds to a positive distance portion of the frequency-domain representation. The apparatus may include means for detecting a radar target based at least in part on the frequency-domain representation and the shaped decision boundary. The apparatus may include means for performing an action based at least in part on detecting the radar target.

Aspects generally include a method, apparatus, system, computer program product, non-transitory computer-readable medium, user device, user equipment, wireless communication device, and/or processing system as substantially described with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. One skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

In some instances, frequency modulated continuous wave (FMCW) radar may be used to detect radar targets (which may also be referred to as "reflecting targets" and/or "targets"). FMCW radar uses a linear frequency modulated signal to obtain range. A received signal is mixed with the transmitted signal to obtain the beat frequency between the two signals. The beat frequency is a function of the round-trip time to the reflecting target, and therefore can be mapped directly to the target's range. Beamforming associated with multiple receiver channels may be used to determine direction of arrival (DoA) of a received signal, which may correlate to a target's azimuthal location. Multiple radar signal chirps may be transmitted in a train of equally spaced pulses in time. Radial motion occurring between pulses within a range of resolution cell induces a shift over the pulses, which may be used to compute the Doppler radial velocity in that cell. Received radar data may be expressed as a three-dimensional (3D) tensor, with the first two dimensions (range and DoA) making up polar space, and the third dimension (Doppler radial velocity) containing velocity information.

In some aspects, a radar device described herein may include an FMCW based radar device. An FMCW based radar device may be used to detect the presence of human tissue near the device. The FMCW based radar device may be a user equipment (UE) and may use FMCW radar to detect human tissue nearby to facilitate compliance with maximum permissible exposure guidelines. However, a receiver of an FMCW based radar device may experience interference in the form of mutual coupling (MC) between the transmitter and receiver. The mutual coupling may be stronger than the reflected signal and may result, for example, from leakage in a chipset and/or over-the-air electromagnetic propagation.

To mitigate mutual coupling, the radar device may cancel the interference. To cancel the interference, the radar device may determine a timing estimation associated with the interference. In some cases, a correlation-based searcher can be used to search a received signal for the interference. In some cases, a phase-based search procedure and/or an adaptive MC cancellation scheme may be used to mitigate the effects of MC. However, the transmission internal frequency local oscillator (IFLO) often has a strong phase noise component. The phase noise component gets multiplied with a MC signal as part of the MC cancellation scheme, which shapes the discrete Fourier transform (DFT) spectrum of the signal post MC cancellation. Since phase noise is a stochastic process and changes over time, the phase noise is unable to be cancelled by the MC cancellation scheme.

A radar device detects radar targets based at least in part on comparing magnitude peaks of a DFT of a post-MC cancellation signal to a threshold. For example, in some cases, a target detection can be declared if the peak of the magnitude of the DFT of the post-MC cancellation signal is greater than some threshold. In some cases, for example, the Neyman-Pearson optimal threshold for target detection in the presence of white noise only can be defined as:

$$\text{Noise}_{db} + \lambda_{db},$$

wherein $\text{Noise}_{db}$ is the estimated white noise energy in decibels (dB) computed from the measurements, and $\lambda_{db}$ is a fixed parameter that can be chosen by training on data collected on the radar device that achieve a predefined probability of false detection for the FMCW radar (e.g., 1%).

The phase noise can complicate the process of setting a detection threshold value ($\lambda_{db}$) as the noise level changes as a function of distance. Thus, using a fixed detection threshold $\lambda_{db}$ can result in suboptimal detection performance as the fixed detection threshold $\lambda_{db}$ needs to be high enough to avoid false detection in the near range as a result of the noise shaping pattern. Using a higher target threshold can result in a higher miss rate for weak targets in the far distance. As a result, a radar device may fail to detect radar targets and, therefore, may fail to trigger useful actions based on target detections, thereby increasing processing and communication resource consumption and/or decreasing device performance in terms of a balance of throughput and compliance with maximum permissible exposure guidelines.

Some implementations described herein enable use of estimation of a shaped noise component of a frequency-domain representation of received signals that may facilitate more accurately detecting radar targets. For example, a radar device may receive a plurality of received signals that include reflected FMCW radar signals and phase noise. The radar device may identify the reflected FMCW radar signals based at least in part on determining a shaped noise component of the frequency-domain representation to facilitate removing the phase noise from the received signals. In this way, aspects disclosed herein may facilitate distinguishing between phase noise and targets, with more reliability. As a result, some aspects may facilitate reducing processing and communication resource consumption and having a positive impact on device performance.

Although some examples are described herein in connection with one or more radar devices being used in a UE-based wireless communication environment, the one or more radar devices may similarly be utilized and/or designed for other types of example environments (e.g., roadway environments, marine environments, and/or aerospace environments, among other examples).

Figure 1:
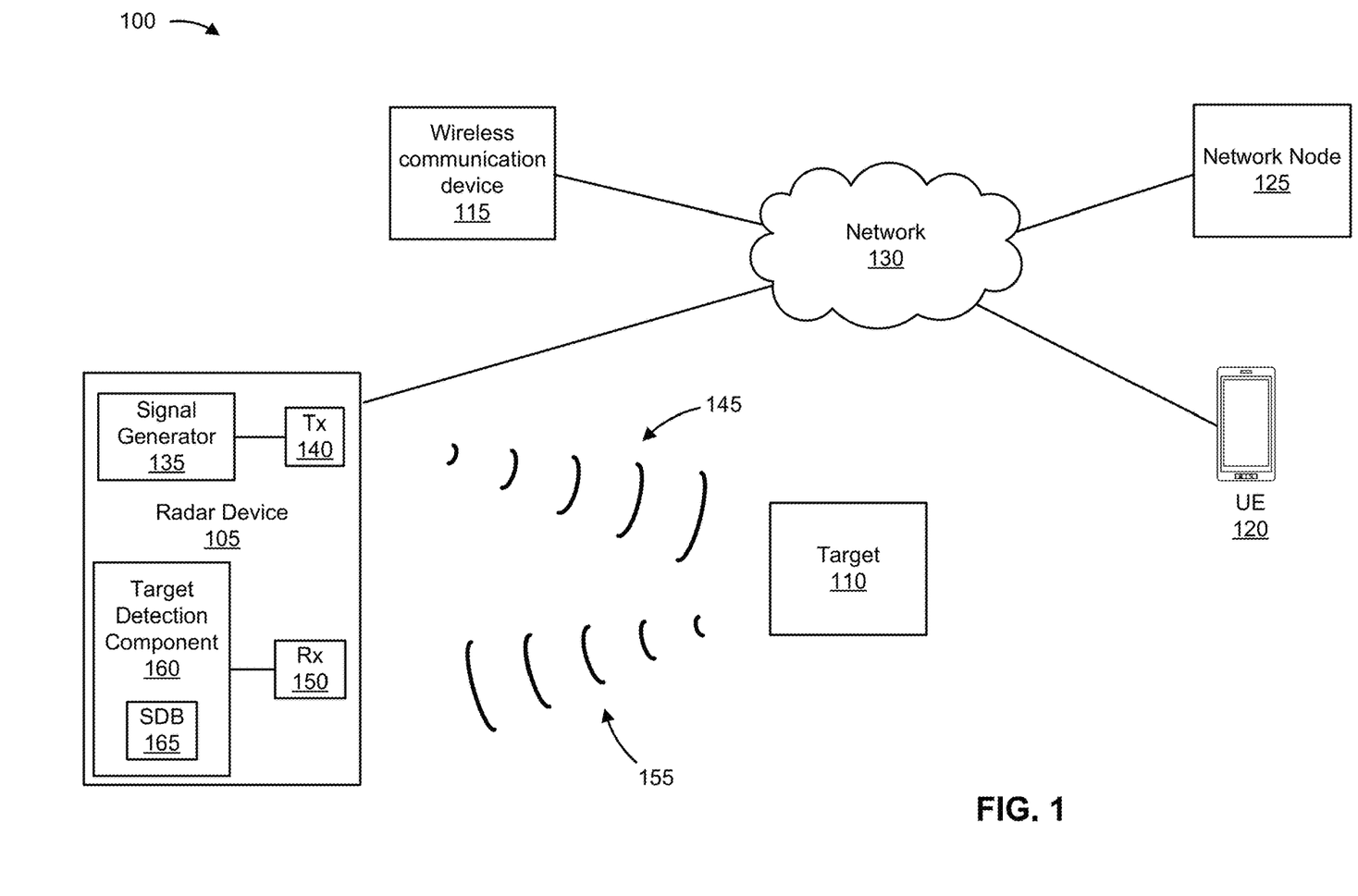
FIG. 1 is a diagram illustrating an example environment in which a frequency modulated continuous wave (FMCW) radar detection procedure for radar detection in the presence of phase noise described herein may be implemented, in accordance with the present disclosure.

FIG. 1 is a diagram of an example environment 100 in which systems and/or methods described herein may be implemented. As shown in FIG. 1, the environment 100 may include a radar device 105 and a target 110. The environment 100 also may include a wireless communication device 115, a UE 120, and a network node 125. Two or more of the radar device 105, the wireless communication device 115, the UE 120, and the network node 125 may communicate with one another via a network 130. The radar device 105 may be, be integrated with, be implemented in, or include a wireless communication device (such as, or similar to, the wireless communication device 115), a network node (such as, or similar to, the network node 125), or a UE (such as, or similar to, the UE 120). In some aspects, the radar device 105 may include a standalone radar device.

The network 130 may be one or more wired networks, one or more wireless networks, or a combination thereof. A wireless network may be or may include elements of a 3G network, a 4G network, a 5G (New Radio (NR)) network, a Long Term Evolution (LTE) network, and/or a 6G network, among other examples. The wireless communication device 115 may be a network node such as a base station, a UE, a relay device, and/or any other type of device capable of wireless communication.

A network node (e.g., the network node 125) may be a base station (a Node B, a gNB, and/or a 5G node B (NB), among other examples), a UE, a relay device, a network controller, an access point, a transmit receive point (TRP), an apparatus, a device, a computing system, one or more components of any of these, and/or another processing entity configured to perform one or more aspects of the techniques described herein. For example, the network node 125 may be an aggregated base station and/or one or more components of a disaggregated base station.

A UE (e.g., the UE 120) may be stationary or mobile. A UE may also be referred to as an access terminal, a terminal, a mobile station, a subscriber unit, a station, and/or the like.

A UE may be, include, or be included in a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, a radar device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, location tags, and/or the like, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). The UE 120 may be included inside a housing that houses components of the UE 120, such as processor components, memory components, and/or the like. In some aspects, the processor components and the memory components may be coupled together. For example, the processor components (e.g., one or more processors) and the memory components (e.g., a memory) may be operatively coupled, communicatively coupled, electronically coupled, electrically coupled, and/or the like.

The radar device 105 includes one or more devices capable of generating, transmitting, receiving, storing, processing, and/or providing information associated with transmitted FMCW radar signals, received signals, and/or the like. The target 110 may be any object capable of reflecting at least a portion of a radar signal. For example, in some aspects, the target 110 may be a human and/or a portion of a human.

As shown, the radar device 105 may include a signal generator 135 that generates an FMCW radar chirp. In some aspects, the FMCW radar chirp may be generated based at least in part on a first set of transmission parameter values. A set of transmission parameter values may indicate a starting frequency, a slope (rate of change of frequency), an initial phase, a power, an amplitude, a periodicity (time interval between chirps), and/or the like.

As shown in FIG. 1, the radar device 105 may include a transmit chain (Tx) 140 that generates and transmits an FMCW radar signal 145 based at least in part on the FMCW radar chirp. In some aspects, the transmit chain 140 may include any type of transmission chain configured to receive one or more FMCW radar chirps and transmit a resulting radar signal 145. As shown in FIG. 1, the radar device 105 may include a receive chain (Rx) 150. In some aspects, the receive chain 150 may be configured to receive a received signal 155, components of the received signal 155, and/or the like. As shown, for example, the received signal 155 may include a reflection, off of the target 110, of the transmitted FMCW radar signal 145. In some aspects, the received signal 150 may include interference. The interference may include, for example, one or more interference signals such as mutually-coupled transmissions.

As shown in FIG. 1, the radar device 105 may include a target detection component 160 configured to detect the radar target 110 based at least in part on a received signal 155 corresponding to the FMCW radar signal 145. As shown, the target detection component 160 may include a shaped decision boundary component (shown as "SDB") 165. The shaped decision boundary component 165 may include one or more components of the radar device 105 configured to identify a reflected FMCW radar signal based at least in part on determining a shaped decision boundary for target detection, as described herein.

In some aspects, as described below in connection with FIGS. 4-6, the radar device 105, using the shaped decision boundary component 165, may determine a shaped noise component of a frequency-domain representation of the received signal 155 and determine, based at least in part on the shaped noise component, a shaped decision boundary for target detection. The frequency-domain representation may represent a plurality of frequency-domain spectrums corresponding to the plurality of received signals received over a time period corresponding to a transmitted FMCW radar chirp. The radar device 105 may detect a radar target based at least in part on the frequency-domain representation and the shaped decision boundary. The radar device 105 may perform an action based at least in part on detecting the radar target.

To determine the shaped decision boundary, the radar device 105 may obtain a frequency-domain representation of a plurality of received signals. The frequency-domain representation of the plurality of received signals may include a plurality of frequency-domain spectrums corresponding to the plurality of received signals. The radar device 105 may determine a shaped noise component of the frequency-domain representation. The shaped noise component may correspond to a negative distance portion of the frequency-domain representation.

The radar device 105 may determine the shaped noise component based at least in part on determining an average spectrum response. The radar device 105 may determine the average spectrum response based at least in part on filtering an adjusted frequency-domain representation using a low pass filter. The low pass filter may include an infinite impulse response low pass filter. The radar device may determine the adjusted frequency-domain representation by calculating at least one square of a magnitude associated with the frequency-domain representation. The shaped noise component may include a portion of the average spectrum response associated with negative frequencies.

The radar device 105 may determine a shaped decision boundary for target detection based at least in part on the shaped noise component. The shaped decision boundary may correspond to a positive distance portion of the frequency-domain representation. The radar device 105 may determine the shaped decision boundary by determining an estimation curve associated with the shaped noise component and determining a reflection of the estimation curve. The reflection of the estimation curve may correspond to positive frequencies of the average spectrum response.

The radar device 105 may detect a radar target based at least in part on the frequency-domain representation and the shaped decision boundary. The radar target may include at least a portion of a human. The radar device 105 may perform an action based at least in part on detecting the radar target. In some aspects, for example, the radar device 105 may include a wireless communication device, and performing the action may include adjusting at least one transmission parameter.

The number and arrangement of devices and components shown in FIG. 1 are provided as one or more examples. In practice, there may be additional devices and/or components, fewer devices and/or components, different devices and/or components, or differently arranged devices and/or components than those shown in FIG. 1. Furthermore, two or more devices and/or components shown in FIG. 1 may be implemented within a single device, or a single device and/or component shown in FIG. 1 may be implemented as multiple, distributed devices. Additionally, or alternatively, a set of devices and/or components (e.g., one or more devices and/or components) of environment 100 may perform one or more functions described as being performed by another set of devices and/or components of environment 100.

Figure 2:
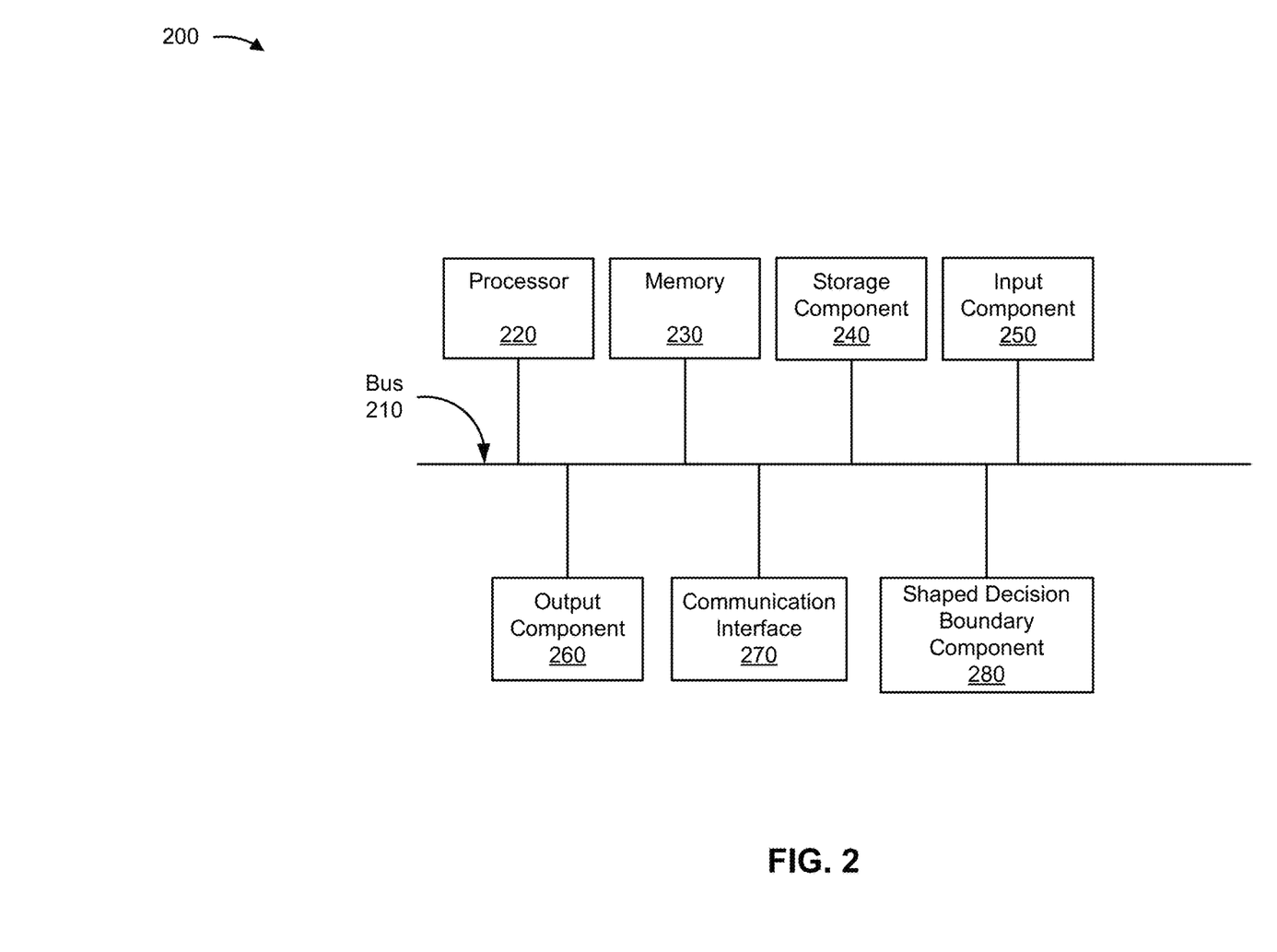
FIG. 2 is a diagram illustrating example components of one or more devices shown in FIG. 1, such as a radar device, in accordance with the present disclosure.

FIG. 2 is a diagram illustrating example components of a device 200, in accordance with the present disclosure. Device 200 may correspond to a radar device (e.g., the radar device 105 depicted in FIG. 1). In some aspects, the radar device 105 may include one or more devices 200 and/or one or more components of device 200. The device 200 may facilitate aspects of using a combined frequency modulated continuous wave (FMCW) radar signal to detect a target, as described below in connection with FIGS. 3-6. As shown in FIG. 2, device 200 may include a bus 210, a processor 220, a memory 230, a storage component 240, an input component 250, an output component 260, a communication interface 270, and/or a shaped decision boundary component 280.

The bus 210 includes a component that permits communication among the components of device 200. The processor 220 may be implemented in hardware, software, or a combination of hardware and software. The processor 220 may include a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some aspects, the processor 220 may include one or more processors capable of being programmed to perform one or more functions. The memory 230 may include a random access memory (RAM), a read only memory (ROM), and/or another type of dynamic or static storage device (e.g., a flash memory, a magnetic memory, and/or an optical memory) that stores information and/or instructions for use by the processor 220.

The storage component 240 may store information and/or software related to the operation and use of the device 200. For example, the storage component 240 may include a hard disk (e.g., a magnetic disk, an optical disk, a magneto-optic disk, a solid state disk, and/or the like), a compact disc (CD), a digital versatile disc (DVD), a floppy disk, a cartridge, a magnetic tape, and/or another type of non-transitory computer-readable medium. The storage component 240 may include a non-transitory computer-readable medium along with a corresponding drive. In some aspects, the storage component 240 may include, be included in, or be integrated with the memory 230.

The input component 250 includes a component that permits the device 200 to receive information, such as via user input (e.g., a touch screen display, a keyboard, a keypad, a mouse, a button, a switch, and/or a microphone). Additionally, or alternatively, the input component 250 may include a component for determining a position or a location of the device 200 (e.g., a global positioning system (GPS)

component, a global navigation satellite system (GNSS) component, and/or the like), a sensor for sensing information (e.g., an accelerometer, a gyroscope, an actuator, another type of position or environment sensor, and/or the like), and/or the like. In some aspects, the input component 250 may include a receive chain (e.g., the receive chain 150, and/or the like) and/or one or more components thereof, shaped decision boundary component 280, and/or one or more components thereof, and/or the like.

The output component 260 may include a component that provides output information from the device 200 (e.g., a display, a speaker, a haptic feedback component, an audio or visual indicator, and/or the like). In some aspects, the output component 260 may include a transmission chain (e.g., the transmission chain 140, and/or the like) and/or one or more components thereof, a signal generator (e.g., the signal generator 135, and/or the like) and/or one or more components thereof, and/or the like.

The communication interface 270 may include a transceiver-like component (e.g., a transceiver and/or a separate receiver and transmitter) that enables the device 200 to communicate with other devices, such as via a wired connection, a wireless connection, or a combination of wired and wireless connections. The communication interface 270 may permit the device 200 to receive information from another device and/or provide information to another device. For example, the communication interface 270 may include an Ethernet interface, an optical interface, a coaxial interface, an infrared interface, a radio frequency interface, a universal serial bus (USB) interface, a wireless local area interface (e.g., a Wi-Fi interface), a cellular network interface, and/or the like. In some aspects, the communication interface 270 may enable the device 200 to perform an action based at least in part on detecting a target, as described above in connection with FIG. 1.

The shaped decision boundary component 280 may include a software component, a hardware component, or a combination thereof, that is configured to perform one or more phase-based search procedures, as described herein. The shaped decision boundary component 280 may be included in, or include one or more aspects of, the processor 220, the memory 230, the storage component 240, the input component 250, the output component 260, and/or the communication interface 270.

The device 200 may perform one or more processes described herein. The device 200 may perform these processes based on the processor 220 executing software instructions stored by a non-transitory computer-readable medium, such as the memory 230 and/or the storage component 240. A computer-readable medium is defined herein as a non-transitory memory device. A memory device includes memory space within a single physical storage device or memory space spread across multiple physical storage devices.

Software instructions may be read into the memory 230 and/or storage component 240 from another computer-readable medium or from another device via the communication interface 270. When executed, software instructions stored in the memory 230 and/or the storage component 240 may cause the processor 220 to perform one or more processes described herein. Thus, for example, software instructions may include, be included in, or otherwise contribute to the instantiation and function of a transmit chain (e.g., the transmit chain 140 and/or the like), a signal generator (e.g., the signal generator 135, and/or the like), a receive chain (e.g., the receive chain 150, and/or the like), and/or a shaped decision boundary component (e.g., the shaped decision boundary component 280), among other examples.

Additionally, or alternatively, hardwired circuitry may be used in place of, or in combination with, software instructions to perform one or more processes described herein. Thus, aspects described herein are not limited to any specific combination of hardware circuitry and/or software.

In some aspects, device 200 includes means for performing one or more processes described herein and/or means for performing one or more operations of the processes described herein. For example, device 200 may include means for detecting a radar target based at least in part on determining a shaped decision boundary. In some aspects, such means may include one or more components of the device 200 described in connection with FIG. 2, such as the bus 210, the processor 220, the memory 230, the storage component 240, the input component 250, the output component 260, the communication interface 270, the shaped decision boundary component 280, and/or the like.

The number and arrangement of components shown in FIG. 2 are provided as an example. In practice, the device 200 may include additional components, fewer components, different components, or differently arranged components than those shown in FIG. 2. Additionally, or alternatively, a set of components (e.g., one or more components) of the device 200 may perform one or more functions described as being performed by another set of components of the device 200.

Figure 3:
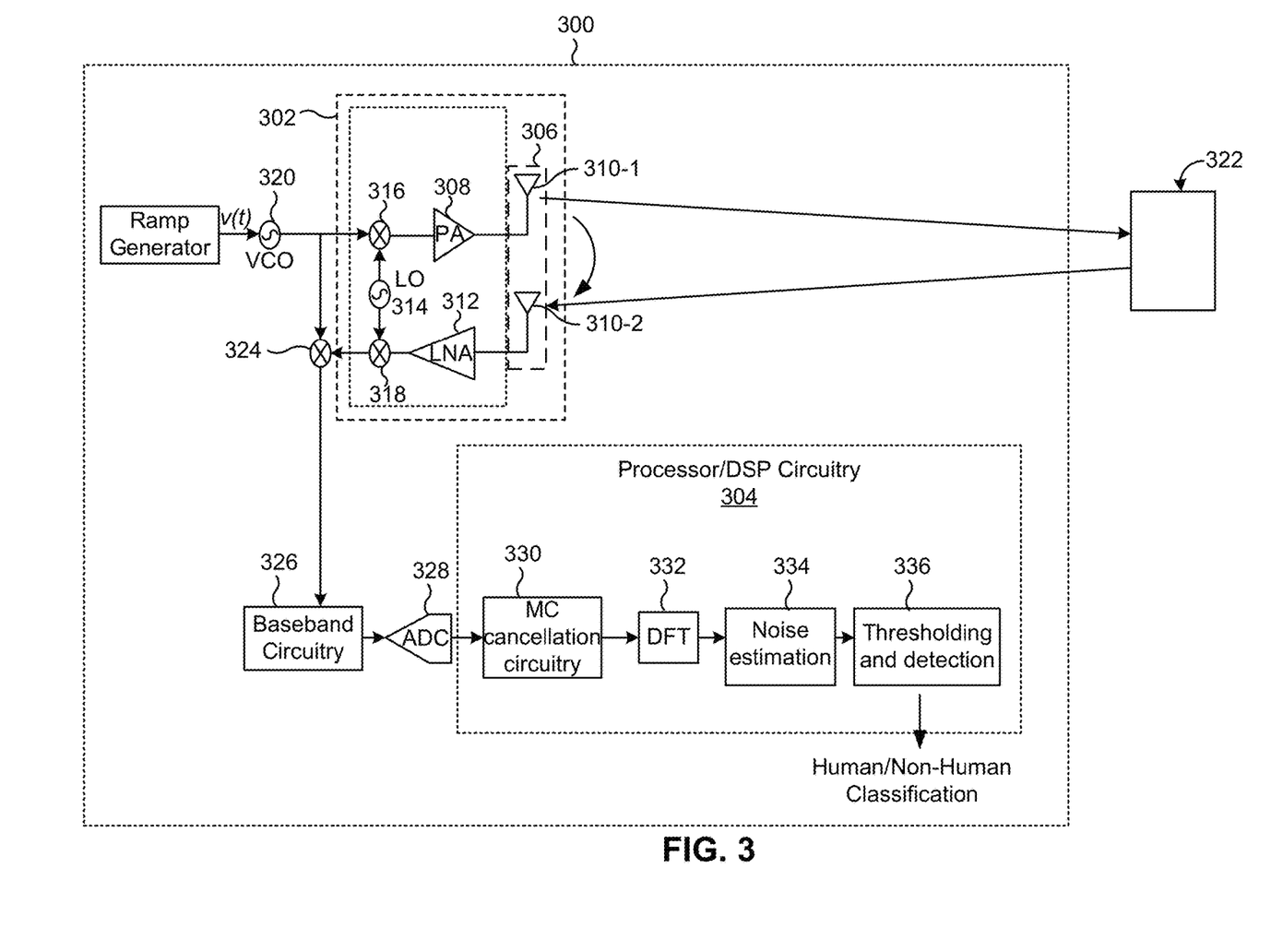
FIG. 3 is a diagram illustrating example components of a radar device, in accordance with the present disclosure.

FIG. 3 is a diagram illustrating example components of a radar device 300, in accordance with the present disclosure. As shown in FIG. 3, the radar device 300 may include a wireless transceiver 302 and processor/DSP circuitry 304 for moderating a transmission to reduce exposure to human target objects according to some aspects of this disclosure. The wireless transceiver 302 includes an antenna array 306. The transceiver 302 includes a power amplifier (PA) 308 configured to amplify a signal for transmission from a transmit antenna 310-1. The transceiver 302 further includes a low noise amplifier (LNA) 312 for amplifying a signal received by a receive antenna 310-2. Local oscillator (LO) circuitry 314 is coupled to mixers 316 and 318. The LO circuitry 314 generates at least one reference signal, which enables the mixers 316 and 318 to upconvert or downconvert analog signals within the transmit or receive chains, respectively. The LO circuitry 314 may further be configured to generate one or more different types of reference signals to support both target object proximity detection/characterization, and wireless communication. In some examples, the LO circuitry 314 may be configured to generate one or more in-phase and quadrature (I/Q) reference signals. In this manner, the transmission from the transmit antenna 310-1 may include I and Q components. After the reflected signal is received from the receive antenna 310-2, I and Q components of the reflected signal may be separated from one another for processing.

The transceiver 302 can also include other additional components that are not depicted in FIG. 3. These additional components can include band-pass filters, additional mixers, and/or switches, among other examples. Moreover, as discussed above, the transceiver 302 may be configured not only for the target object ranging and detection described immediately below, but additionally for wireless communication.

Although not explicitly depicted, the wireless transceiver 302 and/or the processor/DSP circuitry 304 can also include a controller. The controller can include at least one processor and at least one computer readable medium (CRM). The CRM can store computer-executable instructions. The processor and the CRM can be localized at one module or one integrated circuit chip or can be distributed across multiple modules or chips. Together, a processor and associated instructions can be realized in separate circuitry, fixed logic circuitry, and/or hard-coded logic, among other examples. The controller can be implemented as part of the wireless transceiver 302, the processor/DSP circuitry 304, a special-purpose processor configured to perform maximum permissible exposure techniques, and/or a general purpose processor, among other examples.

A voltage-controlled oscillator (VCO) 320 may be configured to generate a sinusoidal signal having a frequency that depends on a voltage of an input signal v(t). By properly varying the input signal v(t) to the VCO 320, the VCO 320 may generate, for example, a sinusoid of increasing frequency over time, often called a chirp signal. This chirp signal can be utilized for an FMCW-based radar. In some aspects, other suitable input signals v(t), and other suitable radar configurations may be utilized within the scope of this disclosure for proximity detection and target object sampling.

The chirp signal may be amplified by the PA 308 and mixed with the LO signal (e.g., upconverted) at the mixer 316 for transmission from a transmit antenna 310-1. The transmitted signal may reflect off a target object 322, being reflected back to a receive antenna 310-2. The reflected signal at the receive antenna 310-2 may be mixed with the LO signal (e.g., downconverted) at the mixer 318 and amplified by the LNA 312.

The output of the LNA 312 (e.g., the amplified received signal) may be mixed with the chirp signal at a mixer 324. With an FMCW-based radar, this mixing creates a beat signal, which is representative of a frequency offset between the radio frequency transmit signal and the radio frequency receive signal. In general, the frequency of the beat signal is proportional to the distance of the target object 322.

The beat signal may be processed by baseband circuitry 326, configured to perform various baseband function corrections and/or frequency translation, among other examples. The output from the baseband circuitry 326 may be converted to the digital domain utilizing one or more analog-to-digital converters (ADC) 328. In an example wherein the radar transmission includes I and Q components, as discussed above, the output from the baseband circuitry 326 may include separate I and Q signals, and the ADC 328 may include two ADCs for respectively converting each of the I and Q components to the digital domain. The digital output from the ADC 328 may then be provided to the processor/DSP circuitry 304. In some implementations, the processor/DSP circuitry 304 may be a DSP or any suitable functional component for carrying out one or more aspects of the described processes.

An undesired side effect of having a closely located transmit antenna 310-1 and receive antenna 310-2, as may occur in a small electronic device, is mutual coupling (MC). That is, part of the transmitted energy may couple back to the receiver. Within the processor/DSP circuitry 304, MC cancellation circuitry 330 may provide cancellation of the undesired energy coupled between the transmit antenna 310-1 and the receive antenna 310-2. To remove the MC component from the received signal, the MC cancellation circuitry 330 uses the transmit signal to cancel the MC component, providing a post-MC cancellation beat signal, $x_r[n]$. Although not explicitly shown, the MC cancellation can be performed in a time domain or a frequency domain via the MC cancellation circuitry 330.

After cancelling the MC, discrete Fourier transform (DFT) circuitry 332 may convert the received beat signal $x_r[n]$ to the frequency domain and provide samples $x_r[f]$ of the beat signal in this domain. The samples in the frequency domain may be referred to as a frequency-domain representation. For example, if 30 measurements of the target object 322 are obtained from 30 sequential target object reflections, the output $x_r[f]$ from the DFT circuitry 332 may be x=[X1, X2, . . . , X30]. Here, each sample x corresponds to a spectrum measured from a single radar reflection. These samples x may then be sent to a noise estimation component 334, which may estimate noise included in the samples. For example, the noise estimation component 334 may estimate white noise and/or phase noise. For example, the noise estimation component 334 may determine a shaped noise component of the frequency-domain representation. A detection component 336 may then process the samples x to determine, for example, whether the target object 322 may be characterized as human. In another example, the detection component 336 may process the samples x to determine one or more parameters or characteristics of the target object 322, including, but not limited to, a location, motion, a breathing rate, a heart rate, etc. In some aspects, for example, the detection component 336 may determine a shaped decision boundary for target detection and detect the radar target based at least in part on the frequency-domain representation and the shaped decision boundary. In some aspects, the noise estimation component 334 and the detection component 336 may be components of a shaped decision boundary component (e.g., the shaped decision boundary component 280 depicted in FIG. 2 and/or the shaped decision boundary component 165 depicted in FIG. 1).

Based on the categorization of the target object 322, the processor/DSP circuitry 304 may perform a wireless communication action. For example, the processor/DSP component 304 may generate a transmission parameter that controls one or more transmission attributes for wireless communication. By specifying the transmission parameter, the processor/DSP component 304 may, for example, cause the transceiver 302 to decrease a transmit power if a target object 322 that is near the radar device 300 is a human, or increase the transmit power if the target object 322 is farther away from the radar device 300 and/or is not a human. For example, the power amplifier 308 may be dynamically controlled based on the target object classification. If the target object 322 is determined to not be human, the processor/DSP component 304 may, for example, keep the transmission parameter unchanged. The transmission parameter can adjust a power level, a beam steering angle, a frequency, a selected antenna or antenna array, or a communication protocol that is used to transmit an uplink signal. The ability to determine the range to the target object 322 and the category of the target object 322, and to control the transceiver 302, enables the processor/DSP component 304 to balance performance of the radar device 300 with compliance or radiation requirements.

The processor/DSP component 304 may also be coupled to the LO circuitry 314 which may enable the processor/DSP component 304 to control the LO circuitry 314 via a mode signal. The mode signal, for example, may cause the LO circuitry 314 to switch between generating reference signals for target object detection/classification, or generating reference signals for wireless communication. Although the wireless transceiver 302 is shown as a direct-conversion transceiver in FIG. 3, the described techniques can also be applied to other types of transceivers, such as superheterodyne transceivers. In general, the LO circuitry 314 may be used to perform frequency conversion between any frequency stage (e.g., between baseband frequencies and radio frequencies, between intermediate frequencies and radio frequencies, and/or between baseband frequencies and intermediate frequencies).

Figure 4:
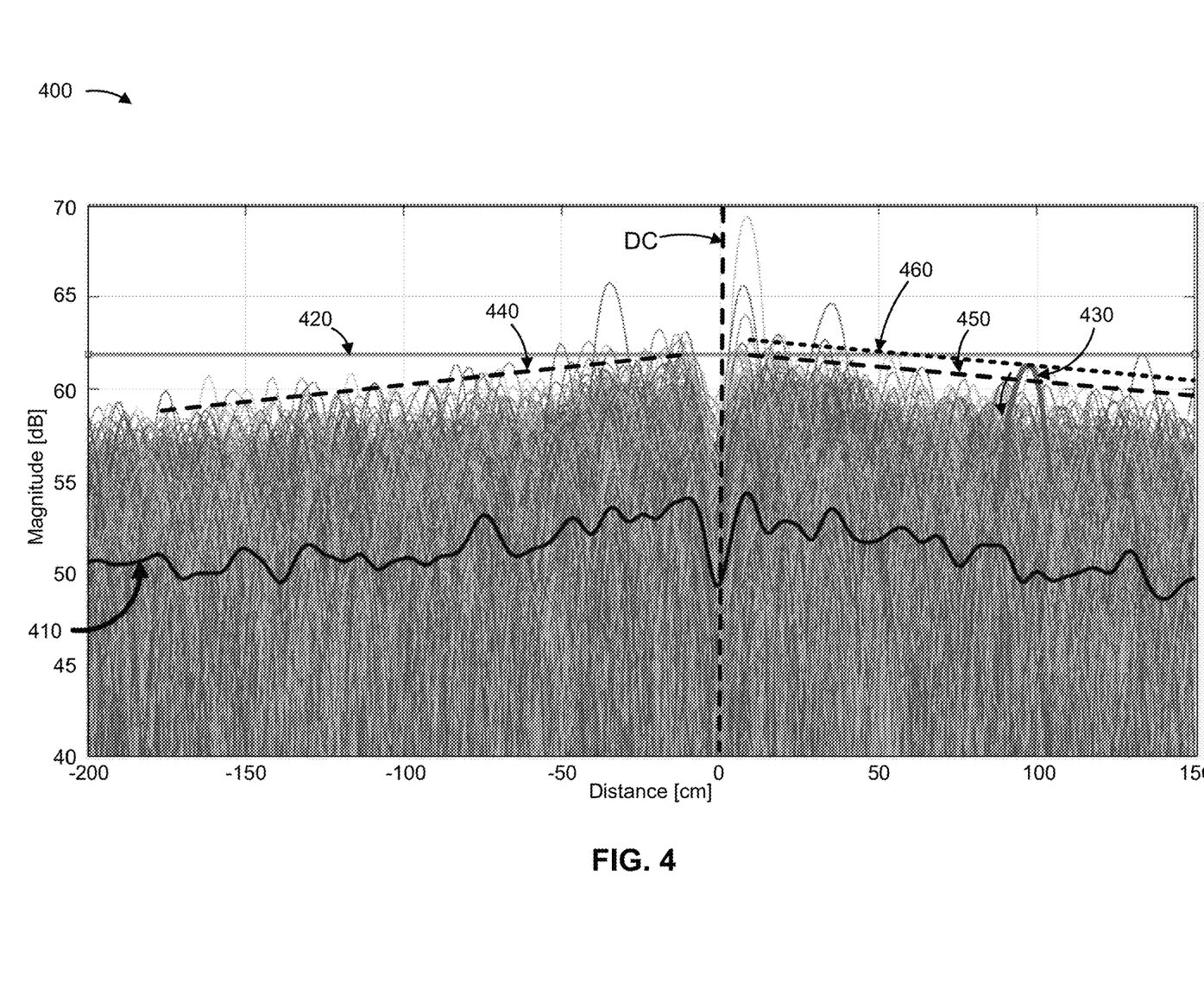
FIGS. 4 and 5 are diagrams illustrating examples associated with a FMCW radar detection procedure for radar detection in the presence of phase noise, in accordance with the present disclosure.

FIG. 4 is a diagram illustrating an example 400 associated with a shaped decision boundary for target detection, in accordance with the present disclosure. Example 400 shows a graphical representation of a post-MC cancellation frequency-domain representation, $x_r[f]$, of a received signal, in which distance is indicated along the horizontal axis and magnitude is indicated along the vertical axis. Any number of frequency-domain spectrums (e.g., samples) may be included in a frequency-domain representation. For example, the frequency-domain representation may have 1 spectrum, 2 spectrums, 10 spectrums, 30 spectrums, 200 spectrums, 2000 spectrums, and/or any other number of spectrums.

As described herein, a radar device (e.g., the radar device 300, the radar device 200, and/or the radar device 105) may determine a shaped noise component of the frequency-domain representation. To determine the shaped noise component, the radar device may calculate at least one square of a magnitude associated with the frequency-domain representation. The resulting at least one squared magnitude may be filtered over consecutive captures using a filter. The filter may include, for example, a low pass filter such as an infinite impulse response (IIR) filter. The filtered representation may be, for example:

$$X_{filtered}[f,T] = \alpha \times X_{filtered}[f,T-1] + (1-\alpha)X(f,T),$$

where T is the radar capture interval, and $0 < \alpha < 1$ is the filter coefficient that controls the learning rate of the filter. In this way, the filtered representation $X_{filtered}[f,T]$ represents the averaged spectrum response over time and may be graphically represented by the curve 410. The portion of the filtered representation $X_{filtered}[f,T]$ associated with the negative frequencies represents the shaped noise. The shaped noise corresponds to a negative distance portion of the frequency-domain representation. The negative distance portion of the frequency domain representation illustrated in example 400 is represented as the portion of the graphical representation that is to the left of the direct current (DC). The DC represents the 0-frequency bin or, in the case of radar, the zero distance.

As shown by the curve 410 representing the average spectrum response over the illustrated spectrums, the shape of the spectrum decays over time due to phase noise. By employing a constant threshold 420, detection algorithms may miss a small amplitude peak 430 corresponding to a weaker target farther in the distance. To ensure detection of the peak 430, the threshold could be lowered, but this would result in a greater likelihood of false detection, as many amplitude peaks would exceed the threshold.

As described herein, some aspects of the disclosed subject matter provide for determining a shaped decision boundary. In some aspects, for example, a radar device may determine a shaped noise component of the frequency-domain representation. The radar device may determine the shaped noise component by determining a linear fit, $X_{filtered,linear\ fit}[f,T]$, for the noise over the negative frequencies. The linear fit $X_{filtered,linear\ fit}[f,T]$ may be determined using any number of different linear fit estimation methods. The shaped noise component may be represented, for example, by the line segment 440. The shaped noise component corresponds to a negative distance portion of the frequency-domain representation.

The radar device may determine a shaped decision boundary for target detection based at least in part on the shaped noise component. To determine the shaped decision boundary, the radar device may perform one or more calculations to determine a reflection, about the DC, of the shaped noise component. For example, the shaped decision boundary, threshold[f,T], may be determined as:

$$\text{threshold}[f,T] = X_{filtered,linear\ fit,dB}[-f,T] + \lambda_{db},$$

where $\lambda_{db}$ is a fixed parameter chosen by the radar device by training on data collected by the radar device, as indicated above. The fixed parameter $\lambda_{db}$ may be chosen so that the radar device achieves a specified probability of false detection. For example, the probability of false detection may be specified to be 0.5%, 1%, 2%, or any other value. Graphically, the shaped decision boundary may be represented by the line segment 450 and represents a reflection of the shaped noise component about the DC. In this way, the shaped decision boundary corresponds to the shape of the phase noise, thereby increasing the chances of capturing weaker target responses while avoiding increased false detection.

As shown by the line segment 460, a magnitude of each point of the shaped decision boundary may, in some aspects, be adjusted. For example, as shown by the line segment 460, the magnitudes of the shaped decision boundary may be increased, thereby increasing a distance between the shaped decision boundary and the average spectrum response. Increasing the distance between the shaped decision boundary and the average spectrum response may result in a lower probability of false detection and a lower likelihood of capturing weak target responses. Decreasing this distance may result in a higher likelihood of capturing weak target responses and a higher probability of false detection. Accordingly, the radar device may adjust the shaped decision boundary so as to achieve a specified balance between the likelihood of capturing weak target responses and the probability of false detection.

As indicated above, FIG. 4 is provided as one or more examples. Other examples may differ from what is described with regard to FIG. 4.

Figure 5:
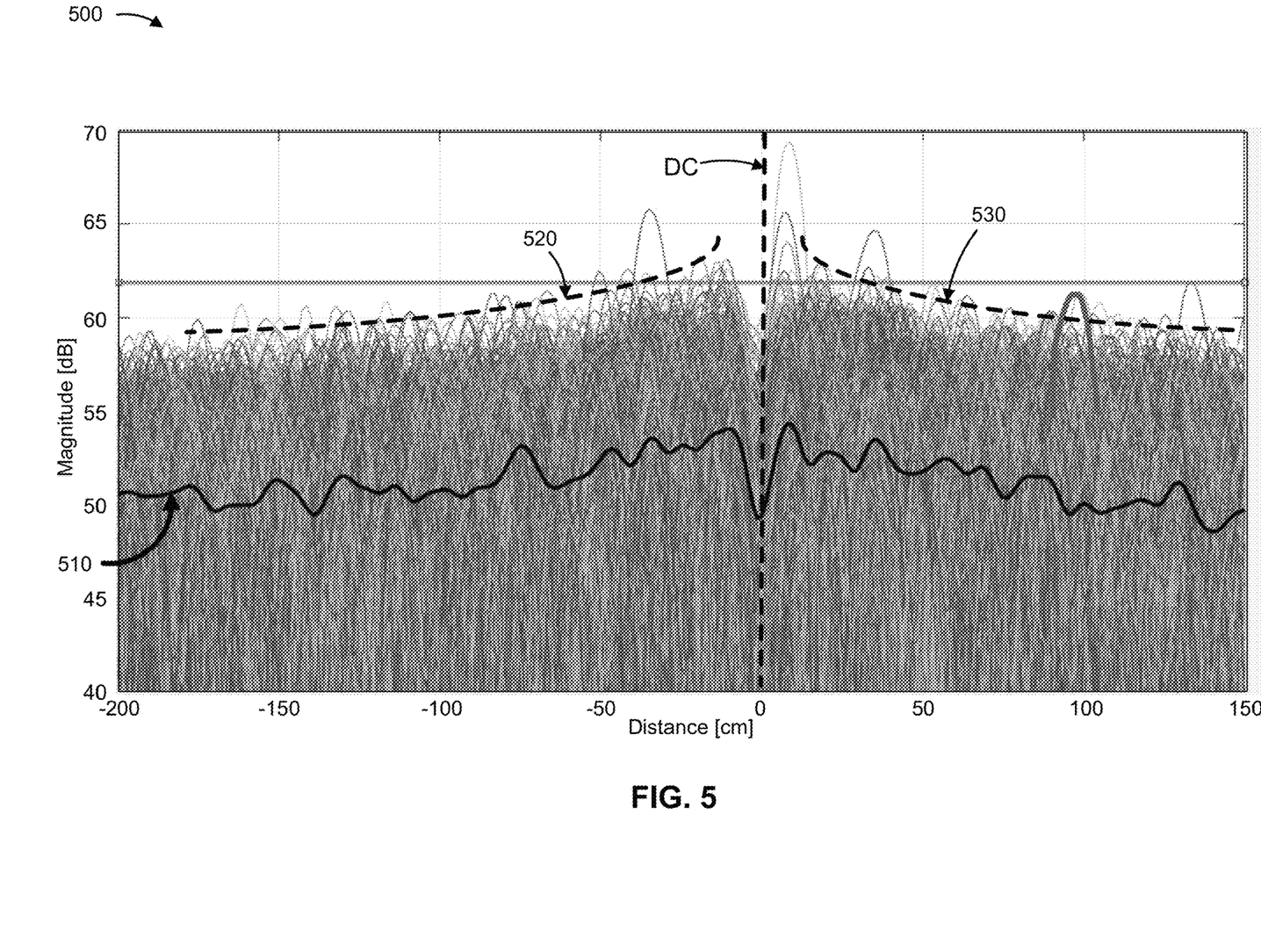

FIG. 5 is a diagram illustrating an example 500 associated with a shaped decision boundary for target detection, in accordance with the present disclosure. Example 500 shows the graphical representation shown in FIG. 4 of the post-MC cancellation frequency-domain representation. In some aspects, a radar device (e.g., the radar device 300, the radar device 200, and/or the radar device 105) may determine a non-linear fit for the noise based at least in part on an average response spectrum over time, represented by the curve 510. The shaped noise component is represented by the curve 520.

The radar device may reflect the shaped noise component about the DC to determine a non-linear shaped decision boundary for target detection, represented by the curve 530. The non-linear shaped decision boundary may generally follow an upper magnitude of the spectrum responses of the frequency-domain representation. Applying a decision boundary that follows an upper magnitude of the spectrums of the frequency-domain representation may result in capturing weaker target signals in some implementations. However, due to the non-linearity of the fit, this improved target capture may come at the cost of more complicated computations, which can result in consumption of more computation resources of the radar device than result from using a linear shaped decision boundary.

As indicated above, FIG. 5 is provided as one or more examples. Other examples may differ from what is described with regard to FIG. 5.

Figure 6:
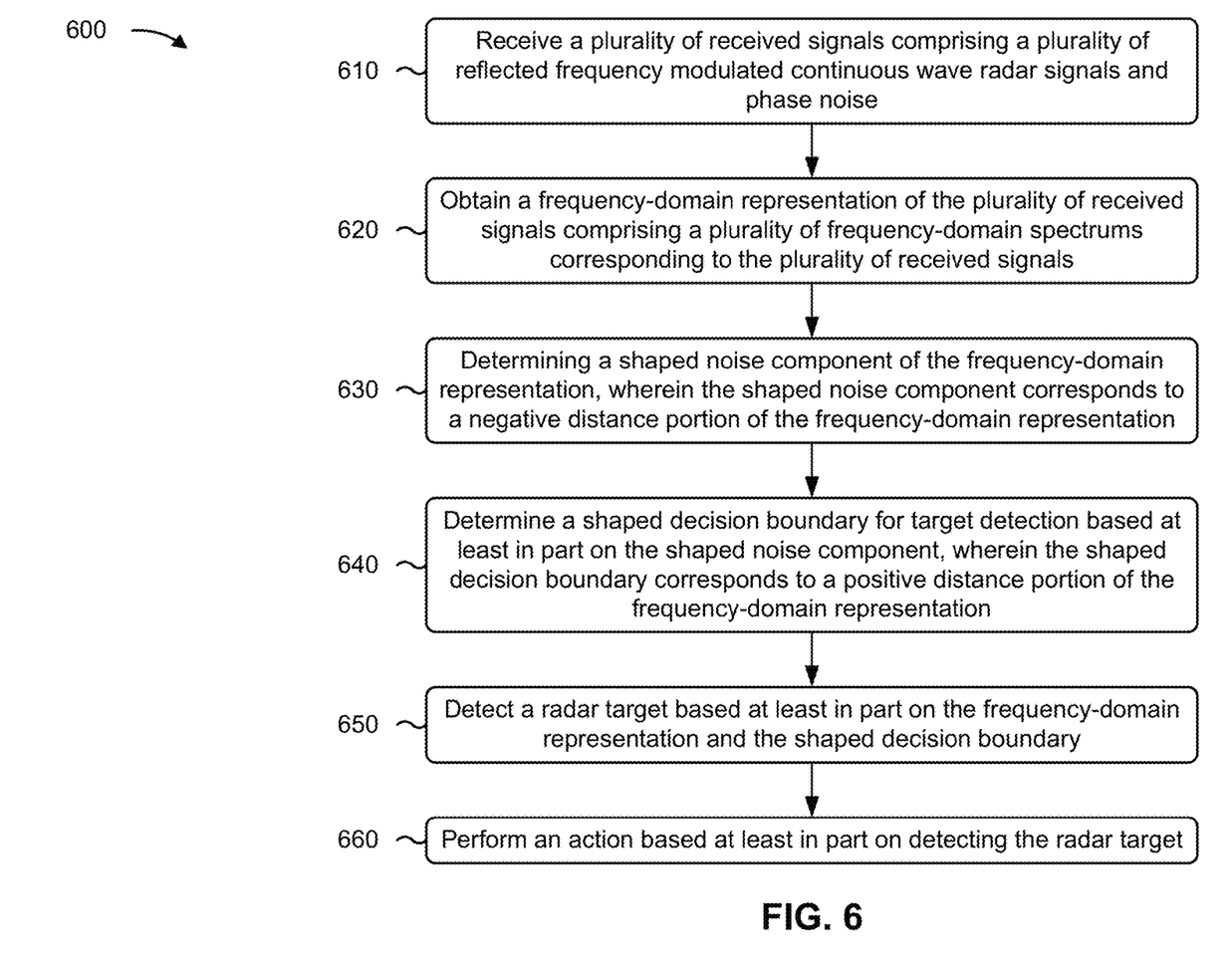
FIG. 6 is a flowchart of an example process associated with a phase-based search procedure for radar detection, in accordance with the present disclosure.

FIG. 6 is a flowchart of an example process 600 associated with FMCW radar detection in the presence of phase noise. In some implementations, one or more process blocks of FIG. 6 are performed by a radar device (e.g., the radar device 300, the radar device 200, and/or the radar device 105). Additionally, or alternatively, one or more process blocks of FIG. 6 may be performed by one or more components of the radar device 200, such as processor 220, memory 230, storage component 240, input component 250, output component 260, communication interface 270, and/or shaped decision boundary component 280.

As shown in FIG. 6, process 600 may include receiving a plurality of received signals comprising a plurality of reflected FMCW radar signals and phase noise (block 610). For example, the radar device may receive a plurality of received signals comprising a plurality of reflected FMCW radar signals and phase noise, as described above.

As further shown in FIG. 6, process 600 may include obtaining a frequency-domain representation of the plurality of received signals comprising a plurality of frequency-domain spectrums corresponding to the plurality of received signals (block 620). For example, the radar device may obtain a frequency-domain representation of the plurality of received signals comprising a plurality of frequency-domain spectrums corresponding to the plurality of received signals, as described above.

As further shown in FIG. 6, process 600 may include determining a shaped noise component of the frequency-domain representation, wherein the shaped noise component corresponds to a negative distance portion of the frequency-domain representation (block 630). For example, the radar device may determine a shaped noise component of the frequency-domain representation, wherein the shaped noise component corresponds to a negative distance portion of the frequency-domain representation, as described above.

As further shown in FIG. 6, process 600 may include determining a shaped decision boundary for target detection based at least in part on the shaped noise component, wherein the shaped decision boundary corresponds to a positive distance portion of the frequency-domain representation (block 640). For example, the radar device may determine a shaped decision boundary for target detection based at least in part on the shaped noise component, wherein the shaped decision boundary corresponds to a positive distance portion of the frequency-domain representation, as described above.

As further shown in FIG. 6, process 600 may include detecting a radar target based at least in part on the frequency-domain representation and the shaped decision boundary (block 650). For example, the radar device may detect a radar target based at least in part on the frequency-domain representation and the shaped decision boundary, as described above.

As further shown in FIG. 6, process 600 may include performing an action based at least in part on detecting the radar target (block 660). For example, the radar device may perform an action based at least in part on detecting the radar target, as described above.

Process 600 may include additional implementations, such as any single implementation or any combination of implementations described below and/or in connection with one or more other processes described elsewhere herein.

In a first implementation, determining the shaped noise component comprises determining an average spectrum response based at least in part on filtering an adjusted frequency-domain representation using a low pass filter. In a second implementation, alone or in combination with the first implementation, process 600 includes determining the adjusted frequency-domain representation by calculating at least one square of a magnitude associated with the frequency-domain representation. In a third implementation, alone or in combination with one or more of the first and second implementations, the low pass filter comprises an infinite impulse response low pass filter.

In a fourth implementation, alone or in combination with one or more of the first through third implementations, the shaped noise component comprises a portion of the average spectrum response associated with negative frequencies. In a fifth implementation, alone or in combination with one or more of the first through fourth implementations, determining the shaped decision boundary comprises determining an estimation curve associated with the shaped noise component, and determining a reflection of the estimation curve, wherein the reflection of the estimation curve corresponds to positive frequencies of the average spectrum response.

In a sixth implementation, alone or in combination with one or more of the first through fifth implementations, the radar target comprises at least a portion of a human. In a seventh implementation, alone or in combination with one or more of the first through sixth implementations, the radar device comprises a wireless communication device, and performing the action comprises adjusting at least one transmission parameter.

Although FIG. 6 shows example blocks of process 600, in some implementations, process 600 includes additional blocks, fewer blocks, different blocks, or differently arranged blocks than those depicted in FIG. 6. Additionally, or alternatively, two or more of the blocks of process 600 may be performed in parallel.

The following provides an overview of some Aspects of the present disclosure:

Aspect 1: A method performed by a radar device, comprising: receiving a plurality of received signals comprising a plurality of reflected frequency modulated continuous wave radar signals and phase noise; obtaining a frequency-domain representation of the plurality of received signals comprising a plurality of frequency-domain spectrums corresponding to the plurality of received signals; determining a shaped noise component of the frequency-domain representation, wherein the shaped noise component corresponds to a negative distance portion of the frequency-domain representation; determining a shaped decision boundary for target detection based at least in part on the shaped noise component, wherein the shaped decision boundary corresponds to a positive distance portion of the frequency-domain representation; detecting a radar target based at least in part on the frequency-domain representation and the shaped decision boundary; and performing an action based at least in part on detecting the radar target.

Aspect 2: The method of Aspect 1, wherein determining the shaped noise component comprises determining an average spectrum response based at least in part on filtering an adjusted frequency-domain representation using a low pass filter.

Aspect 3: The method of Aspect 2, further comprising determining the adjusted frequency-domain representation by calculating at least one square of a magnitude associated with the frequency-domain representation.

Aspect 4: The method of either of Aspects 2 or 3, wherein the low pass filter comprises an infinite impulse response low pass filter.

Aspect 5: The method of any of Aspects 2-4, wherein the shaped noise component comprises a portion of the average spectrum response associated with negative frequencies.

Aspect 6: The method of any of Aspects 2-5, wherein determining the shaped decision boundary comprises: determining an estimation curve associated with the shaped noise component; and determining a reflection of the estimation curve, wherein the reflection of the estimation curve corresponds to positive frequencies of the average spectrum response.

Aspect 7: The method of any of Aspects 1-6, wherein the radar target comprises at least a portion of a human.

Aspect 8: The method of any of Aspects 1-7, wherein the radar device comprises a wireless communication device, and wherein performing the action comprises adjusting at least one transmission parameter.

Aspect 9: An apparatus for wireless communication at a device, comprising a processor; memory coupled with the processor; and instructions stored in the memory and executable by the processor to cause the apparatus to perform the method of one or more of Aspects 1-8.

Aspect 10: A device for wireless communication, comprising a memory and one or more processors coupled to the memory, the one or more processors configured to perform the method of one or more of Aspects 1-8.

Aspect 11: An apparatus for wireless communication, comprising at least one means for performing the method of one or more of Aspects 1-8.

Aspect 12: A non-transitory computer-readable medium storing code for wireless communication, the code comprising instructions executable by a processor to perform the method of one or more of Aspects 1-8.

Aspect 13: A non-transitory computer-readable medium storing a set of instructions for wireless communication, the set of instructions comprising one or more instructions that, when executed by one or more processors of a device, cause the device to perform the method of one or more of Aspects 1-8.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a "processor" is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods are described herein without reference to specific software code, since those skilled in the art will understand that software and hardware can be designed to implement the systems and/or methods based, at least in part, on the description herein.

As used herein, "satisfying a threshold" may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. Many of these features may be combined in ways not specifically recited in the claims and/or disclosed in the specification. The disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (e.g., a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," or the like are intended to be open-ended terms that do not limit an element that they modify (e.g., an element "having" A may also have B). Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A radar device for wireless communication, comprising:
    a receiver configured to receive a plurality of signals comprising a plurality of reflected frequency modulated continuous wave radar signals and phase noise; and
    one or more processors, coupled to the receiver, configured to:
        determine a frequency-domain representation of the plurality of received signals comprising a plurality of frequency-domain spectrums corresponding to the plurality of received signals;
        determine a shaped noise component of the frequency-domain representation based at least in part on determining a characteristic for the phase noise over a set of negative frequencies, wherein the shaped noise component corresponds to a negative distance portion of the frequency-domain representation with respect to a direct current corresponding to a zero distance from the radar device;
        determine a shaped decision boundary for target detection, wherein the shaped decision boundary comprises a reflection of the shaped noise component about the direct current corresponding to the zero distance from the radar device, wherein the shaped decision boundary corresponds to a positive distance portion of the frequency-domain representation with respect to the direct current corresponding to the zero distance from the radar device;

adjust a distance between the shaped decision boundary and an average spectrum response to generate an adjusted shaped decision boundary, wherein the distance between the shaped decision boundary and the average spectrum response is adjusted based at least in part on adjusting a magnitude of points of the shaped decision boundary;

detect a radar target based at least in part on the frequency-domain representation and the adjusted shaped decision boundary; and perform an action based at least in part on detecting the radar target.

2. The radar device of claim 1, wherein the one or more processors are configured to determine the average spectrum response based at least in part on filtering an adjusted frequency-domain representation using a low pass filter.

3. The radar device of claim 2, wherein the one or more processors are further configured to determine the adjusted frequency-domain representation by calculating at least one square of a magnitude associated with the frequency-domain representation.

4. The radar device of claim 2, wherein the low pass filter comprises an infinite impulse response low pass filter.

5. The radar device of claim 2, wherein the shaped noise component is associated with a portion of the average spectrum response associated with the set of negative frequencies.

6. The radar device of claim 2, wherein the one or more processors are further configured to:
determine an estimation curve associated with the shaped noise component; and
determine a reflection of the estimation curve, wherein the reflection of the estimation curve corresponds to positive frequencies of the average spectrum response.

7. The radar device of claim 1, wherein the radar target comprises at least a portion of a human.

8. The radar device of claim 1, wherein the radar device comprises a wireless communication device, and wherein the one or more processors, to perform the action, are configured to:
categorize the radar target as human or non-human; and
adjust at least one transmission parameter when the radar target is categorized as human, wherein the at least one transmission parameter is not adjusted when the radar target is categorized as non-human.

9. A method performed by a radar device, comprising:
receiving a plurality of received signals comprising a plurality of reflected frequency modulated continuous wave radar signals and phase noise;
obtaining a frequency-domain representation of the plurality of received signals comprising a plurality of frequency-domain spectrums corresponding to the plurality of received signals;
determining a shaped noise component of the frequency-domain representation based at least in part on determining a characteristic for the phase noise over a set of negative frequencies, wherein the shaped noise component corresponds to a negative distance portion of the frequency-domain representation with respect to a direct current corresponding to a zero distance from the radar device;

determining a shaped decision boundary for target detection, wherein the shaped decision boundary comprises a reflection of the shaped noise component about the direct current corresponding to the zero distance from the radar device, wherein the shaped decision boundary corresponds to a positive distance portion of the frequency-domain representation with respect to the direct current corresponding to the zero distance from the radar device;

adjusting a distance between the shaped decision boundary and an average spectrum response to generate an adjusted shaped decision boundary, wherein the distance between the shaped decision boundary and the average spectrum response is adjusted based at least in part on adjusting a magnitude of points of the shaped decision boundary;

detecting a radar target based at least in part on the frequency-domain representation and the adjusted shaped decision boundary; and performing an action based at least in part on detecting the radar target.

10. The method of claim 9, wherein the method further comprises determining an average spectrum response based at least in part on filtering an adjusted frequency-domain representation using a low pass filter.

11. The method of claim 10, further comprising determining the adjusted frequency-domain representation by calculating at least one square of a magnitude associated with the frequency-domain representation.

12. The method of claim 10, wherein the low pass filter comprises an infinite impulse response low pass filter.

13. The method of claim 10, wherein the shaped noise component is associated with a portion of the average spectrum response associated with the set of negative frequencies.

14. The method of claim 10, wherein the method further comprises:
determining an estimation curve associated with the shaped noise component; and
determining a reflection of the estimation curve, wherein the reflection of the estimation curve corresponds to positive frequencies of the average spectrum response.

15. The method of claim 9, wherein the radar target comprises at least a portion of a human.

16. The method of claim 9, wherein the radar device comprises a wireless communication device, and wherein performing the action comprises:
categorizing the radar target as human or non-human; and
adjusting at least one transmission parameter when the radar target is categorized as human, wherein the at least one transmission parameter is not adjusted when the radar target is categorized as non-human.

17. A non-transitory computer-readable medium storing a set of instructions for wireless communication, the set of instructions comprising:
one or more instructions that, when executed by one or more processors of a radar device, cause the radar device to:
receive a plurality of received signals comprising a plurality of reflected frequency modulated continuous wave radar signals and phase noise;
obtain a frequency-domain representation of the plurality of received signals comprising a plurality of frequency-domain spectrums corresponding to the plurality of received signals;
determine a shaped noise component of the frequency-domain representation based at least in part on determining a characteristic for the phase noise over a set of negative frequencies, wherein the shaped noise component corresponds to a negative distance portion of the frequency-domain representation with respect to a direct current corresponding to a zero distance from the radar device;

determine a shaped decision boundary for target detection, wherein the shaped decision boundary comprises a reflection of the shaped noise component about the direct current corresponding to the zero distance from the radar device, wherein the shaped decision boundary corresponds to a positive distance portion of the frequency-domain representation with respect to the direct current corresponding to the zero distance from the radar device;

adjust a distance between the shaped decision boundary and an average spectrum response to generate an adjusted shaped decision boundary, wherein the distance between the shaped decision boundary and the average spectrum response is adjusted based at least in part on adjusting a magnitude of points of the shaped decision boundary;

detect a radar target based at least in part on the frequency-domain representation and the adjusted shaped decision boundary; and perform an action based at least in part on detecting the radar target.

18. The non-transitory computer-readable medium of claim 17, wherein the one or more instructions further cause the radar device to determine an average spectrum response based at least in part on filtering an adjusted frequency-domain representation using a low pass filter.

19. The non-transitory computer-readable medium of claim 18, wherein the one or more instructions further cause the radar device to determine the adjusted frequency-domain representation by calculating at least one square of a magnitude associated with the frequency-domain representation.

20. The non-transitory computer-readable medium of claim 18, wherein the low pass filter comprises an infinite impulse response low pass filter.

21. The non-transitory computer-readable medium of claim 18, wherein the shaped noise component is associated with a portion of the average spectrum response associated with the set of negative frequencies.

22. The non-transitory computer-readable medium of claim 18, wherein the one or more instructions further cause the radar device to:

determine an estimation curve associated with the shaped noise component; and determine a reflection of the estimation curve, wherein the reflection of the estimation curve corresponds to positive frequencies of the average spectrum response.

23. The non-transitory computer-readable medium of claim 17, wherein the radar device comprises a wireless communication device, and wherein the one or more instructions, that cause the radar device to:

categorize the radar target as human or non-human; and adjust at least one transmission parameter when the radar target is categorized as human, wherein the at least one transmission parameter is not adjusted when the radar target is categorized as non-human.

24. An apparatus for wireless communication, comprising:

means for receiving a plurality of received signals comprising a plurality of reflected frequency modulated continuous wave radar signals and phase noise;

means for obtaining a frequency-domain representation of the plurality of received signals comprising a plurality of frequency-domain spectrums corresponding to the plurality of received signals;

means for determining a shaped noise component of the frequency-domain representation based at least in part on determining a characteristic for the phase noise over a set of negative frequencies, wherein the shaped noise component corresponds to a negative distance portion of the frequency-domain representation with respect to a direct current corresponding to a zero distance from the apparatus;

means for determining a shaped decision boundary for target detection, wherein the shaped decision boundary comprises a reflection of the shaped noise component about the direct current corresponding to the zero distance from the apparatus, wherein the shaped decision boundary corresponds to a positive distance portion of the frequency-domain representation with respect to the direct current corresponding to the zero distance from the apparatus;

means for adjusting a distance between the shaped decision boundary and an average spectrum response to generate an adjusted shaped decision boundary, wherein the distance between the shaped decision boundary and the average spectrum response is adjusted based at least in part on adjusting a magnitude of points of the shaped decision boundary;

means for detecting a radar target based at least in part on the frequency-domain representation and the adjusted shaped decision boundary; and means for performing an action based at least in part on detecting the radar target.

25. The apparatus of claim 24, further comprising means for determining an average spectrum response based at least in part on filtering an adjusted frequency-domain representation using a low pass filter.

26. The apparatus of claim 25, further comprising means for determining the adjusted frequency-domain representation by calculating at least one square of a magnitude associated with the frequency-domain representation.

27. The apparatus of claim 25, wherein the low pass filter comprises an infinite impulse response low pass filter.

28. The apparatus of claim 25, wherein the shaped noise component is associated with a portion of the average spectrum response associated with the set of negative frequencies.

29. The apparatus of claim 25, further comprising:

means for determining an estimation curve associated with the shaped noise component; and means for determining a reflection of the estimation curve, wherein the reflection of the estimation curve corresponds to positive frequencies of the average spectrum response.

30. The apparatus of claim 24, wherein the apparatus comprises a wireless communication device, and wherein the means for performing the action comprise:

means for categorizing the radar target as human or non-human; and means for adjusting at least one transmission parameter when the radar target is categorized as human, wherein the at least one transmission parameter is not adjusted when the radar target is categorized as non-human.

* * * * *